United States Patent [19]
Sandberg et al.

[11] Patent Number: 5,715,280
[45] Date of Patent: Feb. 3, 1998

[54] METHOD FOR PARTIALLY MODULATING AND DEMODULATING DATA IN A MULTI-CARRIER TRANSMISSION SYSTEM

[75] Inventors: Stuart D. Sandberg, Arlington; Peter N. Heller, Somerville; Michael Tzannes, Newton, all of Mass.

[73] Assignee: Aware, Inc., Bedford, Mass.

[21] Appl. No.: 668,575

[22] Filed: Jun. 20, 1996

[51] Int. Cl.$^6$ .............................. H04K 1/10; H04L 27/28
[52] U.S. Cl. .............................. 375/260; 375/261
[58] Field of Search ....................... 375/260, 261, 375/340; 332/103

[56] References Cited

U.S. PATENT DOCUMENTS

| | | | |
|---|---|---|---|
| 4,802,190 | 1/1989 | Schouhamer Immink | 375/38 |
| 4,912,763 | 3/1990 | Galand et al. | 381/31 |
| 5,259,003 | 11/1993 | Berger et al. | 375/38 |
| 5,497,398 | 3/1996 | Tzannes et al. | 375/260 |
| 5,636,246 | 6/1997 | Tzannes et al. | 375/260 |

*Primary Examiner*—Stephen Chin
*Assistant Examiner*—Mohammad Ghayour
*Attorney, Agent, or Firm*—Calvin B. Ward

[57] ABSTRACT

A decoder and an encoder for extracting a subset of symbols from, or inserting a subset of symbols into, a communication channel in which M symbols are transmitted as the amplitudes of M sinusoidal carriers. The decoder recovers K symbols, $S_p \ldots S_{p+K-1}$, from an analog signal generated by modulating M sinusoidal carriers for a frame period. Each carrier is modulated with an amplitude proportional to the value of one of M symbols, the $i^{th}$ carrier being modulated by symbol $S_i$. The K symbols are a contiguous subset of the M symbols. The decoder includes a down-converter for down-converting to the modulated signal on the communication channel to generate a down-converted signal in which the carriers corresponding to $S_p \ldots S_{p+K-1}$ occupy frequencies starting from 0. An analog-digital converter generates K time-domain samples in each frame period from the down-converted signal. These time-domain samples are converted to K frequency-domain values representing the symbols $S_p \ldots S_{p+K-1}$ by a time-domain to frequency-domain overlapped transform. The encoder encodes K symbols, $S_1 \ldots S_K$, as the amplitudes of K sinusoidal carriers, the K sinusoidal carriers comprising a contiguous block of carriers in a signal comprising M sinusoidal carriers in which each of the carriers is modulated by a signal having an amplitude determined by the value of one of the symbols for a time equal to one frame period. The encoder includes a frequency-domain to time-domain overlapped transform for generating K time-domain samples from the K symbols, the time-domain samples representing a modulated carrier comprising K sinusoidal carriers, each the carrier being modulated by a signal having an amplitude determined by the value of one of the K symbols. A digital-to-analog converter converts the K time-domain samples to an analog signal. The analog signal is then up-converted such that the sinusoidal carrier modulated by $S_1$ has a frequency equal to the $p^{th}$ carrier of the M sinusoidal carriers, wherein p>0.

6 Claims, 3 Drawing Sheets

METHOD FOR PARTIALLY MODULATING AND DEMODULATING DATA IN A MULTI-CARRIER TRANSMISSION SYSTEM

FIELD OF THE INVENTION

The present invention relates to systems for multicarrier transmission of data, and more particularly, to an improved method for transmitting or receiving subsets of data for use in such systems.

BACKGROUND OF THE INVENTION

In a multicarrier system, a communication path having a fixed bandwidth is divided into a number of sub-bands having different frequencies. The width of the sub-bands is chosen to be small enough to allow the distortion in each sub-band to be modeled by a single attenuation and phase shift for the band. If the noise level in each band is known, the volume of data sent in each band may be optimized by choosing a symbol set having the maximum number of symbols consistent with the available signal to noise ratio of the channel. By using each sub-band at its maximum capacity, the amount of data that can be transmitted in the communication path is maximized.

In practice, such systems are implemented by banks of digital filters which make use of fast Fourier transforms or other transforms as described in detail below. Consider the case in which a single data stream is to be transmitted over the communication path which is broken into M sub-bands. During each communication cycle, the portion of the data stream to be transmitted is converted to M symbols chosen to match the capacity of the various channels. Each symbol is the amplitude of a corresponding sub-carrier. The time domain signal to be sent on the communication path is obtained by modulating each sub-carrier by its corresponding amplitude and then adding the modulated carriers to form the signal to be placed in the communication path. This operation is normally carried out by transforming the vector of M symbols via an orthogonal transform to generate M time domain values that are sent in sequence on the communication path. At the other end of the communication path, the M time domain values are accumulated and transformed via the inverse transform to recover the original M symbols after equalization of the transformed data to correct for the attenuation and phase shifts that occurred in the channels.

In multi-user systems, each user is assigned a portion of the communication channel for messages between the user and a central office or head-end terminal. In principle, each user can use a bank of M filters to decode the messages being sent from the central office and then select the sub-channels that contain information intended for the user in question. Similarly, each user can modulate that user's carriers using a digital filter bank. The computational workload needed to decode the messages from the central office is of order MlogM if a fast Fourier transform based encoding system is used. This computational workload is sufficient to require computing hardware that represents a significant fraction of the hardware cost at each user's location. Hence, it would be advantageous to have a system that required less hardware when only a portion of the M sub-bands contain data is intended for any given user.

Broadly, it is the object of the present invention to provide an improved multi-carrier transmission system.

It is a further object of the present invention to provide a multi-carrier transmission system that allows each user in a multi-user system to decode only the portion of the data stream intended for that particular user at a lower computational work load than that required to decode the entire data stream.

These and other objects of the present invention will become apparent to those skilled in the art from the following detailed description of the invention and the accompanying drawings.

SUMMARY OF THE INVENTION

The present invention comprises a decoder and an encoder for extracting a subset of symbols from, or inserting a subset of symbols into, a communication channel in which M symbols are transmitted as the amplitudes of M sinusoidal carriers. The decoder recovers K symbols, $S_p \ldots S_{p+K-1}$, from an analog signal generated by modulating M sinusoidal carriers for a frame period. Each carrier is modulated with an amplitude proportional to the value of one of M symbols, the $i^{th}$ carrier being modulated by symbol $S_i$. The K symbols are a contiguous subset of the M symbols. The decoder includes a down-converter for down-converting to the modulated signal on the communication channel to generate a down-converted signal in which the carriers corresponding to $S_p \ldots S_{p+K-1}$ occupy frequencies starting from 0. An analog-digital converter generates K time-domain samples in each frame period from the down-converted signal. These time-domain samples are converted to K frequency-domain values representing the symbols $S_p \ldots S_{p+K-1}$ by a time-domain to frequency-domain converter based on an overlapped transform. The encoder encodes K symbols, $S_1 \ldots S_K$, as the amplitudes of K sinusoidal carriers, the K sinusoidal carriers comprising a contiguous block of carriers in a signal comprising M sinusoidal carriers in which each of the carriers is modulated by a signal having an amplitude determined by the value of one of the symbols for a time equal to one frame period. The encoder includes a frequency-domain to time-domain overlapped transform for generating K time-domain samples from the K symbols, the time-domain samples representing a modulated carrier comprising K sinusoidal carriers, each carrier being modulated by a signal having an amplitude determined by the value of one of the K symbols. A digital-to-analog converter converts the K time-domain samples to an analog signal. The analog signal is then up-converted such that the sinusoidal carrier modulated by $S_1$ has a frequency equal to the $p^{th}$ carrier of the set of M sinusoidal carriers, wherein p>0.

DETAILED DESCRIPTION OF THE INVENTION

Figure 1:
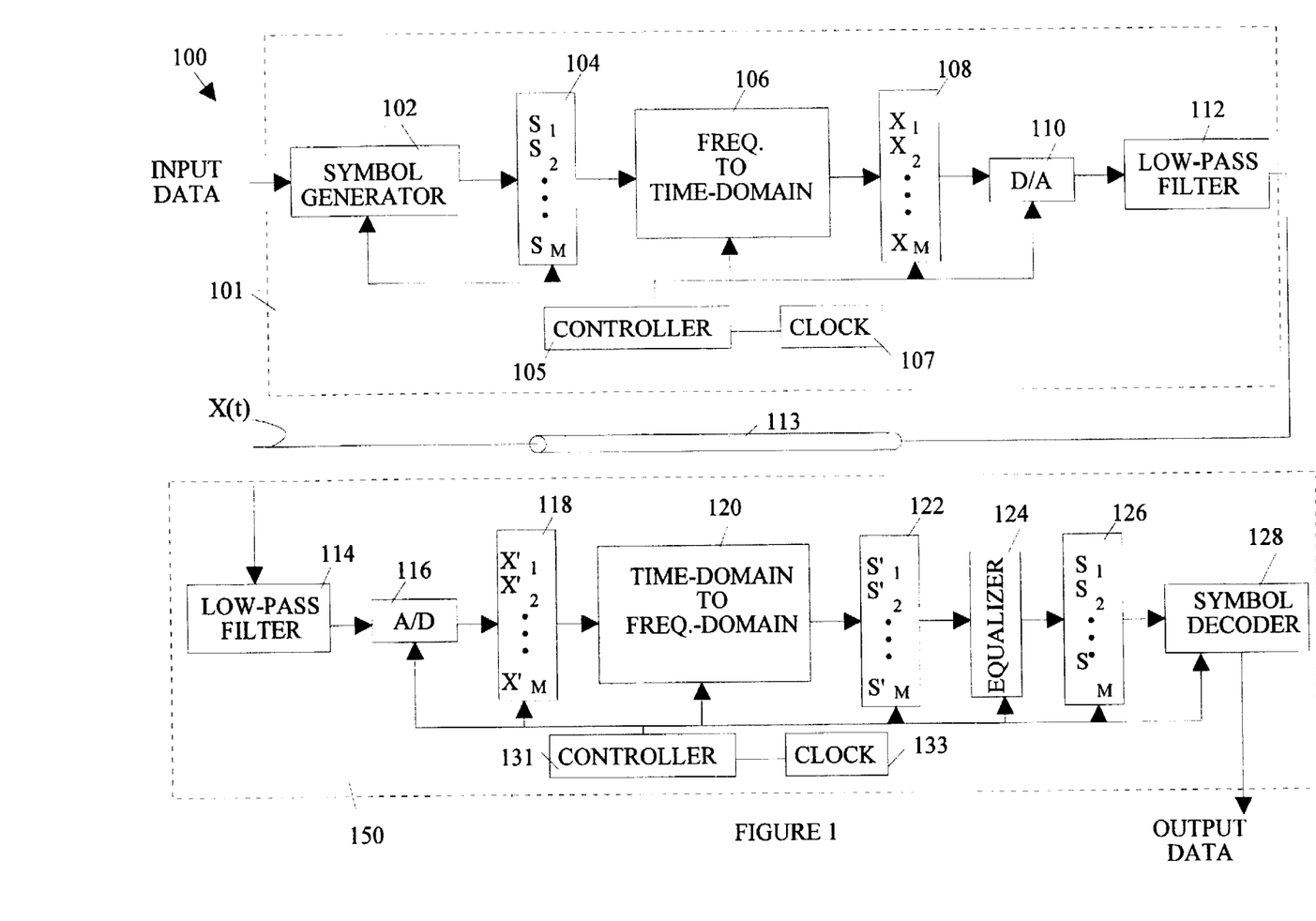
FIG. 1 which is a block diagram of a multicarrier transceiver.

The manner in which the present invention operates can be more easily understood with reference to FIG. 1 which is a block diagram of a multicarrier transceiver 100. Transceiver 100 transmits data on a communication link 113. The input data stream is received by a symbol generator 102 which converts a run of data bits into M symbols $S_1, S_2, \ldots, S_M$ which are stored in a register 104. The number of possible states for each symbol will depend on the noise levels in the corresponding frequency band on the transmission channel 113. For the purposes of the present discussion, it is sufficient to note that each symbol is a number whose absolute value may vary from 0 to some predetermined upper bound and that the run of data bits is much greater than M.

Transceiver 100 treats the symbols $S_i$ as if they were the amplitude of a signal in a narrow frequency band. Frequency to time-domain transform circuit 106 generates a time domain signal $X_i$, for i from 1 to M, that has the frequency components $S_i$. The time domain signals are stored in a shift register 108. The transform is an overlapped transform based on a perfect-reconstruction or near-perfect-reconstruction filter bank pairs. The reader is referred to P. P. Vaidyanathan, Multirate Systems and Filter Banks (Prentice Hall, Englewood Cliffs, N.J., 1993) which is hereby incorporated by reference. For the purposes of this discussion, it is sufficient to note that such a filter bank pair consists of M distinct "synthesis" filters $f_i$, i=1 to M. Each filter has a length W>M. The second member of the pair is a set of "analysis" filters $h_i$, also of length W. The filters satisfy, or approximately satisfy in the case of near-perfect reconstruction filters, the relationship $$\sum_k h_i[k]f_j[k - Mn] = \delta_{i,j}\delta_{n,0}$$

where $\delta_{x,y}=0$ if $x \neq y$ and $\delta_{x,y}=1$ if x=y. The quantity W/M is a positive integer and will be referred to as the "genus" of the transformation in the following discussion. In general, the quantity W=Mg where both M and g are integers.

A frequency-domain to time-domain overlapped transform has several benefits when used in a multicarrier transceiver. Most prior art multicarrier systems utilize a block Fourier transform (FFT). These methods for subchannelization employ filters with side lobes at −13 dB, leading to significant mixing of information among nearby frequency bands in the presence of channel distortions. The slow rolloff of the FFT filters also allows a narrow band interferer such as a radio station to destroy the usefulness of a larger number of channels adjacent to the channel in which the interferer is operating. In contrast, filter banks that utilize overlapped transforms have side lobes whose magnitude depends on the genus of the transform, and for reasonable values of the genus provide significantly lower side lobes. The lower side lobes lead to significantly less mixing and increased immunity to narrow band interferers.

One useful class of such filter banks are the cosine-modulated filter banks. In these filter banks, the analysis filters $h_i$ are obtained by first windowing the data with the "polyphase components" of an FIR filter h[n] of length W and then applying an M-point Discrete Cosine Transform (DCT) to a suitable combination of the resulting 2M polyphase window outputs. The synthesis transform is obtained similarly by applying a DCT and then windowing the polyphase components with the same Window h[n].

When used in conjunction with a transceiver of the type described in FIG. 1, each of the M symbol streams $S_i$ is unsampled by a factor of M and then convolved with the $i^{th}$ response $f_i$ of the synthesis filter bank matrix to generate an output $Y_i$, where $$y_i[k] = \sum_n S_i[k - nM]f_i[n].$$

The M outputs $Y_i$, are then summed to yield $X_k$ which are loaded into shift register 108, i.e., $$X_k = \sum_i y_i[k]$$

It should be noted that a group of g samples of each symbol stream $S_i$ must be held in memory to perform the overlapping frequency-domain-to time-domain transform. Here, g is the genus of the transform.

The contents of shift register 108 represent, in digital form, the next segment of the signal that is to be actually transmitted over communication link 113. The actual transmission is accomplished by clocking the digital values onto transmission link 113 (possibly after up-conversion to radio frequencies) after converting the values to analog voltages using D/A converter 110. Clock 107 provides the timing pulses for the operation. The output of D/A converter 110 is low-pass filtered by filter 112 before being placed on communication link 113. The time required to clock the M time-domain samples onto communication link will be referred to as the frame period. During one frame period, M symbols are transmitted. During the following frame period, M new symbols are produced by the symbol generator 102 and loaded into register 104, where each g-element symbol stream $S_i$ is shifted once in a FIFO fashion, thus eliminating the "oldest" or least-recently-used element in each symbol stream. It will be assumed that there is no interval between successive frames.

At the receiving end of transmission link 113, the transmission segment is recovered. The signals received on communication link 113 are low-pass filtered to reduce the effects of high-frequency noise transients. The signals are then digitized and shifted into a register 118. When M values have been shifted into register 118, the contents thereof are converted via a time-domain to frequency-domain transform circuit 120 to generate a set of frequency domain symbols $S'_i$. This transformation is the inverse of the transformation generated by frequency to time-domain transform 106. It should be noted that communication link 113 will, in general, both attenuate and phase shift the signal represented by the $X_i$. Hence, the signal values received at low-pass filter 114 and A/D converter 116 will differ from the original signal values. Thus, the contents of shift register 118 will not match the corresponding values from shift register 108. For this reason, the contents of shift register 118 are denoted by $X'_i$. Similarly, the output of the time to frequency-domain transform will also differ from the original symbols $S_i$; hence, the contents of register 122 are denoted by $S'_i$. Equalizer 124 corrects the $S'_i$ for the attenuation and phase shift resulting from transmission over communication link 113 to recover the original symbols which are stored in buffer 126. In addition, equalizer 124 corrects the symbols for intersymbol interference arising from synchronization errors between the transmitter and receiver. These corrections are accomplished by sending known training samples through the system which are used to train equalizer 124. Finally, the contents of buffer 126 are decoded to regenerate the original data stream by symbol decoder 128.

The coding and decoding transformations are preferably carried out using fast algorithms based on the FFT, fast DCT, or the equivalent. However, even if such fast algorithms are utilized, the computational complexity of recovering the M symbols from the data stream is of order $M(g+0.75\log_2 M)$. As rioted above, the computational hardware needed to carry out the decoding can be a significant fraction of the cost of the receiver section of such a transceiver. The present invention reduces this computational workload when only a portion of the M symbols are intended for the receiver in question.

Consider the case in which only K of the M symbols sent in each frame are intended for the receiver. Here, it is assumed that M/K=L where both K and L are integers. The present invention utilizes a decoding scheme in which the computational complexity required to decode the K symbols is of order $K(g+0.75\log_2 K)$ when a cosine-modulated filter bank is used to code and decode the symbols.

Consider the case in which the remote station is assigned the K sub-bands centered at frequency $f_p$, the set of K sub-bands having a total bandwidth of B. These K symbols will be denoted by $S_p$ to $S_{p+K-1}$ in the following discussion. The present invention provides a complex downconversion of these symbols which is equivalent to moving the K tones to baseband in such a way that these K symbols could have been generated by a K-symbol per frame time-domain-to-frequency domain transform operating only on the K sub-bands. The less computationally complex K-symbol overlapping transform is then applied to demodulate the signal.

Figure 2:
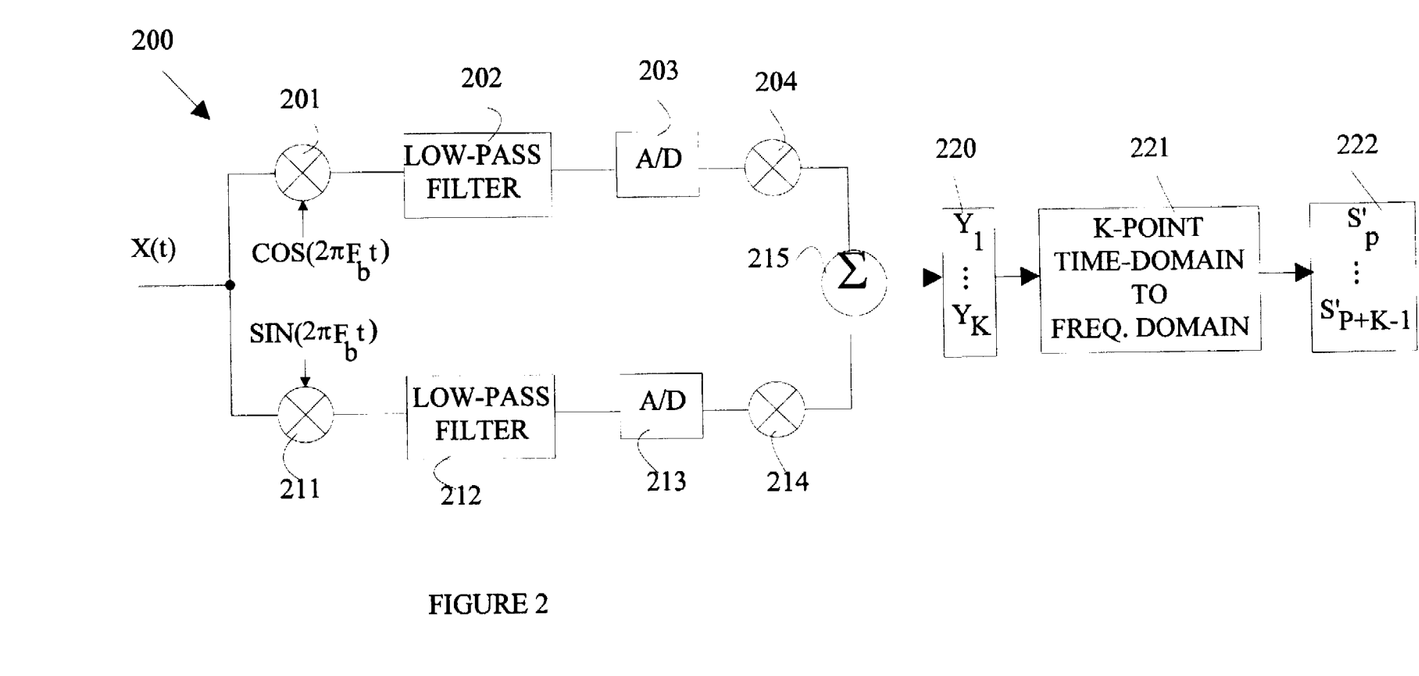
FIG. 2 is a block diagram of a receiver 200 utilizing a decoder according to the present invention.

It will be assumed that a guard band is present between these K sub-bands and any sub-bands at frequencies above of below the K sub-bands. Refer now to FIG. 2 which is a block diagram of a receiver 200 according to the present invention. Receiver 200 operates by first down-converting the modulated signal on communication link 113 and then sampling the down-converted signal at a rate that generates K time-domain sample values for each frame of M symbols sent by the transmitter 101 shown in FIG. 1. The incoming signal is first down-converted by mixers 201 and 211 and low pass filters 202 and 212 to generate the quadrature components of a signal centered at 0 frequency in the frequency domain. The outputs of the low-pass filters are digitized by A/D converters 203 and 213. These converters operate at a clock frequency of C where, C=FK/M and F is the frequency with which samples are shifted from register 108 into D/A converter 110. Each A/D converter generates Ksamples per frame. The samples are combined by multiplication circuits 204 and 214 and sum circuit 215 to form a data stream in which the even numbered samples are the output of A/D converter 202 multiplied by $(-1)^{k/2}$, and the odd numbered samples are the output of A/D converter 212 multiplied by $(-1)^{(k-1)/2}$. Here k is the clock cycle number of the clock input to the A/D converters. This data stream is shifted into register 220. The odd-numbered samples outputted by A/D converter 202 and the even-numbered samples outputted by A/D converter 212 are effectively discarded by multiplication by zero. Thus the multiplication and sum circuits 204, 214, and 215 have the effect of interleaving the two data streams with appropriate sign changes. At each frame, K samples will be shifted into register 220. These time-domain samples are then converted to the corresponding symbol values by time-domain to frequency-domain transform circuit 221. In the case in which the time-to-frequency domain transform is implement as a cosine-modulated filter bank, the smaller K-point transform may be implemented with a K-point DCT and a window $h^K$ which is obtained from the original window h[n] by downsampling by a factor of L=M/K, i.e., $h^K[n]=h[nL]$.

If this downsampled window is used, the A/D converters 203 and 213 must sample their respective signals at a fractional time offset of (M-K)/(2K) to retain the perfect-reconstruction property.

In a practical realization of the system described in FIG. 2, one may wish to use an alternate implementation in which A/D converters 203 and 213 sample at a multiple (e.g., 4× or 8×) of the final sampling rate, after which their signals are passed through a FIR digital lowpass filter followed by downsampling by the multiple in question before input to the multiplication circuits 204 and 214. This approach is preferred if aliasing due to downsampling causes errors, and power or other constraints, prevent the use of sufficiently high-performance analog lowpass filters for filters 202 and 212.

The non-ideal nature of the analog lowpass filters 202 and 212 imposes another change in a practical realization of this system. The full set of K subbands will not be useable. In particular, several sub-bands at each end of the set will be corrupted by the action of the lowpass filter. For this reason, several subbands should be set aside as guard tones, and only $K_0<K$ subbands used for transmission of the actual data.

The symbol values are denoted by $S'_p$ to $S'_{p+K-1}$ to reflect the possibility that the symbols may have been corrupted by distortions on communication link 113. If such distortions occurred, the symbols can be corrected by an equalizer as described above with reference to FIG. 1.

The arrangement shown in FIG. 2 is equivalent to a down-converting system in which the input signal is first down-converted such that the band of interest, i.e., that corresponding to symbols $S_p$ to $S_{p+K-1}$ is centered at zero frequency. After low-pass filtering this complex signal, the signal is up-converted such that $S_p$ is at baseband. The up-converted signal is then sampled at a rate of K samples per frame period. The circuit shown in FIG. 2 is preferred over this equivalent circuit because it eliminates the need for the up-conversion. In addition, the A/D converters in the circuit shown in FIG. 2 need only sample the signal at half the rate of the A/D converter in the equivalent down-converting design.

Figure 3:
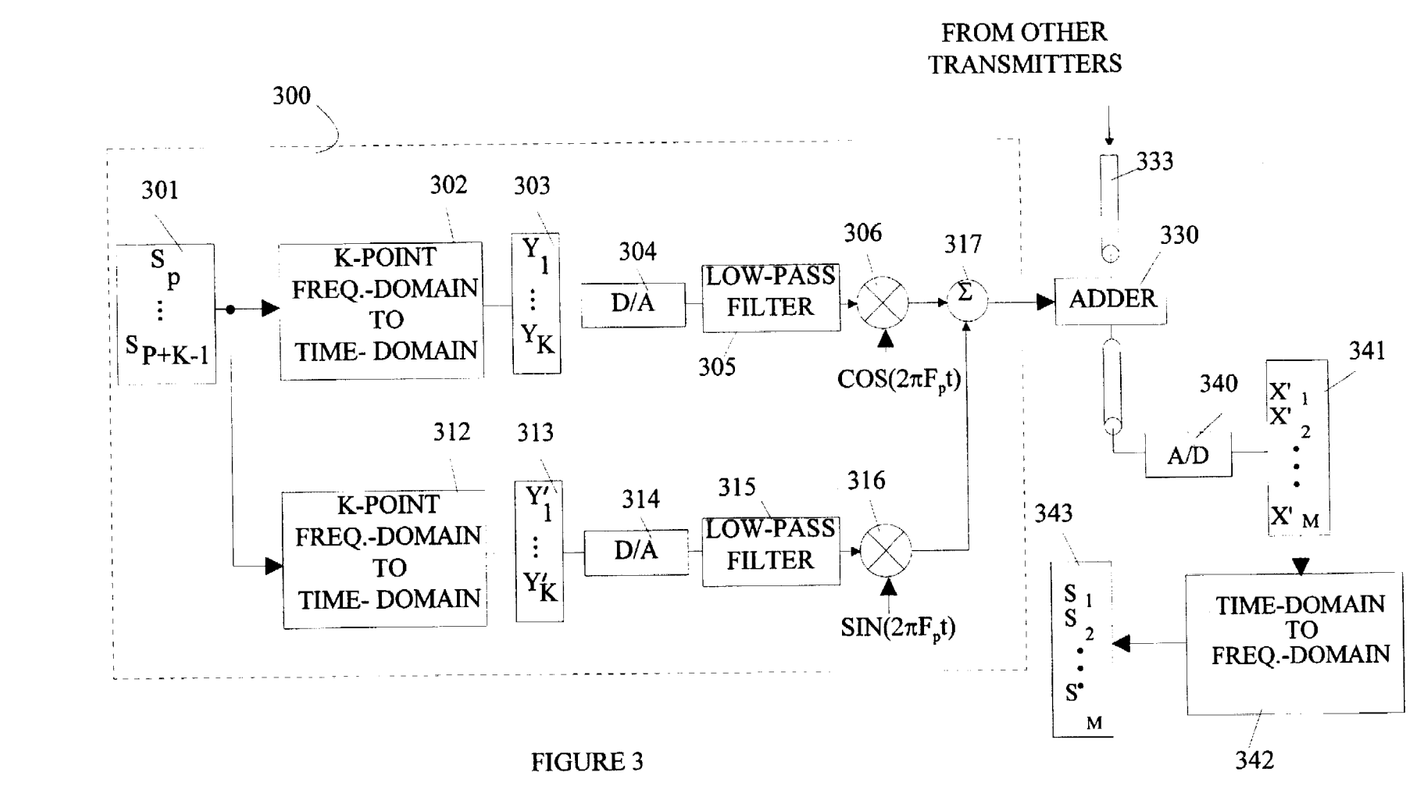
FIG. 3 is a block diagram of a portion of a communication system in which one transmitter uses an encoder according to the present invention.

A group of K symbols can be inserted onto a communication link by using a transmitter that performs the reverse of the operations described above with respect to receiver 200. Refer now to FIG. 3 which is a block diagram of a transmitter 300 for inserting K symbols into a communication stream such that the K symbols are received as symbols $S_p$ to $S_{p+K-1}$ in an M symbol frame by a receiver such as receiver 150 shown in FIG. 1. The remaining symbols in each frame are generated by other transmitters in the system. All of the transmitters communicate their respective symbols to the receiver on a communication link 333. Transmitter 300 receives K symbols during each frame period. The symbols are shifted into register 301. The contents of register 301 are input to two distinct frequency-domain-to-time domain transforms 302 and 312 once per frame. Each of the transforms 302 and 312 generate K time-domain samples per frame period which are stored in registers 303 and 313, respectively. The frequency-domain-to-time-domain transforms are the analysis filter bank or overlapped transform 302, and a complementary overlapped transform 312 which computes the Hilbert transform of the output of transform 302. Together, the transforms 302 and 312 generate inphase and quadrature components of a signal for subsequent single-sideband modulation onto channel 333. When the full M-symbol time-domain-to-frequency domain transform 120 at the receiver is based on a cosine-modulated filter bank with lowpass prototype filter h[n], the K-symbol transforms 302 and 312 at the transmitter may be based on a lowpass prototype filter $h^K[n]$ obtained by downsampling h[n] by the factor L=M/K, i.e., $h^K[n]=h[Ln]$ The K time-domain values from shift registers 303 and 313 are then shifted into D/A converters 304 and 314 to generate an analog signal sampled at the rate C=FK/M, where F is the rate at which samples are shifted from A/D converter 116 into register 118. In the case of a cosine-modulated lapped transform, if the prototype filter is obtained via the above downsampling formula, the D/A converters 304 and 314 must sample their respective signals at a fractional time offset of (M−K)/(2K) to preserve the perfect-reconstruction property of the transform. The outputs of D/A converters 304 and 314 are passed through lowpass filters 305 and 315. The outputs of the lowpass filters 305 and 315 are upconverted by mixers 306, and 316. Mixer 306 zeros out even-indexed samples and mixer 316 zero out odd-indexed samples. Thus, when the mixer outputs are added by summer 317, the result is an interleaving of alternate samples from lowpass filters 305 and 315 with sign changes and modulation up to the center frequency $F_p$. Taken together with the in-phase and quadrature transforms 301 and 312, this accomplishes a single-sideband upconversion of the partial band signal to the frequency band centered at $F_p$ on communication link 333.

The analog signal so generated is combined with other signals on communication link 333 by an adder 330. The combined signal is decoded by an M point per frame receiver comprising the elements shown at 340–343. In particular, M time domain points $X'_1 \ldots X'_M$ are recovered each frame period by A/D converter 340 which shifts the recovered points into register 341. An M point time-domain to frequency-domain transform circuit 342 then converts the values stored in register 341 to recover the M symbols $S_1 \ldots s_M$ stored in register 343. It is to be understood that transform circuit 342 may also include equalizer circuitry of the type discussed above with reference to FIG. 1 as well as the other components discussed in relation to receiver 150. These components have been omitted from FIG. 3 to simplify the figure.

It will be apparent to those skilled in the art that there are equivalent means for performing the combination of the in-phase and quadrature outputs and modulation to carrier frequency $F_p$ in order to complete the upconversion. For example, the D/A converters 304 and 314 could sample at half the overall rate, with one half the samples out of phase. The mixers 306 and 316 and summer 317 would then perform the combination of these analog signals to generate one signal containing information at the full rate.

In a practical realization of the system described in FIG. 3, one may wish to use an alternative implementation in which the contents of shift registers 303 and 313 are passed through FIR digital lowpass filters, followed by upsampling by some integer factor(e.g., 2, 4, or 8) before being input to D/A converters 304 and 314. The D/A converters would sample at a multiple (using the same integer factor) of the original sampling rate. This alternative approach would be preferable if imaging due to upsampling is a problem, and power or other constraints, prevent the use of sufficiently high-performance analog lowpass filters for filters 305 and 315.

The non-ideal nature of the analog lowpass filters 305 and 315 imposes another change in a practical realization of a system because the full set of K subbands will not be useable. Several subbands at each end of the set will be corrupted by the action of the lowpass filters. The number of corrupted subbands will depend on the deviation of the actual filters from ideal filters. For this reason, several subbands should be set aside as guard tones, and only $K_0<K$ of the subbands used for transmission of data.

Various modifications to the present invention will become apparent to those skilled in the art from the foregoing description and accompanying drawings. Hence, the present invention is to be limited solely by the scope of the following claims.

What is claimed is:

1. A decoder for recovering K symbols, $S_p \ldots S_{p+K-1}$ from an analog signal generated by modulating M sinusoidal carriers for a frame period, each said carrier being modulated with an amplitude proportional to the value of one of M symbols, the $i^{th}$ said carrier being modulated by a signal having an amplitude determined by symbol $S_i$, said K symbols being a contiguous subset of said M symbols, said decoder comprising:

a down-converter for down-converting said modulated signal to generate a down-converted signal in which said carriers corresponding to $S_p \ldots S_{p+K-1}$ occupy frequencies starting at baseband;

an analog-digital converter for generating K time-domain samples in each frame period from said down-converted signal; and a time-domain to frequency-domain overlapped transform for converting said K time-domain samples to K frequency-domain values representing said symbols $S_p \ldots S_{p+K-1}$.

2. The decoder of claim 1 wherein said down converter comprises mixers for retrieving inphase and quadrature components of said analog signal;

lowpass filters;

first and second analog-to-digital converters, each said analog-to-digital converter generating an output by sampling of said quadrature or inphase components, respectively, at a rate of K samples per frame period; and mixing means for generating a real digital signal from said outputs of said analog-to-digital converters.

3. The decoder of claim 1 wherein said time-domain to frequency-domain transform is a cosine-modulated transform.

4. An encoder for encoding K symbols, $S_1 \ldots S_K$, as the amplitudes of K sinusoidal carriers, said K sinusoidal carriers comprising a contiguous block of carriers in a signal comprising M sinusoidal carriers in which each said carrier is modulated by a signal having an amplitude determined by the value of one of said symbols for a time equal to one frame period, said encoder comprising:

means for receiving said K symbols;

a frequency-domain to time-domain overlapped transform for generating K time-domain samples from said K symbols, said time-domain samples representing a modulated carrier comprising K sinusoidal carriers, each said carrier being modulated by a signal having an amplitude determined by the value of one of said K symbols;

digital to analog converter for converting said K time-domain samples to an analog signal;

an up-converter for shifting the frequency of said analog signal such that the sinusoidal carrier modulated by $S_1$ has a frequency equal to the $p^{th}$ said carrier of said M sinusoidal carriers, wherein p>0.

5. The encoder of claim 4 wherein said up-converter comprises first and second frequency-domain to time-domain overlapped transforms generating inphase and quadrature components of a K-component signal, said second transform generating a Hilbert transform of an output from said first transform;

first and second digital-to-analog converters, said first digital to analog converter sampling said inphase components and said second digital to analog converter sampling said quadrature components, said first and second digital to analog converters operating at a sampling rate of K samples per frame period, said first and second digital to analog converters generating first and second analog signals, respectively;

first and second lowpass filters for filtering said first and second analog signals, respectively, to generate first and second filtered signals, respectively;

upconverters for shifting the frequency of said first and second filtered signals; and signal combining means for combining said shifted first and second filtered signals for transmission over a communication link.

6. The encoder of claim 4 wherein said frequency-domain to time-domain transform is a cosine-modulated transform.

* * * * *

UNITED STATES PATENT AND TRADEMARK OFFICE
CERTIFICATE OF CORRECTION

PATENT NO : 5,715,280
DATED : Feb. 3, 1998
INVENTOR(S) : Sandberg, et al.

It is certified that error appears in the above-identified patent and that said Letters Patent is hereby corrected as shown below:

Column 1, line 61 – Insert - - that - - after "data"

Column 2, line 18 – Insert - - the - - between "of" and "M"

Column 2, line 49 – Delete "which" after "Fig.1"

Column 5, line 39 – Replace "202" with - - 203 - -

Column 5, line 40 - Replace "212" with - - 213 - -

Column 5, line 44 - Replace "202" with - - 203 - -

Column 5, line 45 – Replace "212" with - - 213 - -

Column 5, line 53 – Replace "implement" with - - implemented - -

Column 7, line 12 – Replace "zero" with - - zeros - -

In the Abstract (right hand column)

Line 26 – Delete "the" after "each"

Column 3, line 61 – Replace "Y" with lower case - -y - -

Column 3, line 66 – Replace "Y" with lower case - - y - -

UNITED STATES PATENT AND TRADEMARK OFFICE
CERTIFICATE OF CORRECTION

PATENT NO. : 5,715,280

DATED : Feb. 3, 1998

INVENTOR(S) : Sandberg, et al.

It is certified that error appears in the above-identified patent and that said Letters Patent is hereby corrected as shown below:

Column 4, line 62 – Replace "rioted" with - - noted - -

Signed and Sealed this

Twenty-first Day of April, 1998

Attest:

BRUCE LEHMAN

Attesting Officer

Commissioner of Patents and Trademarks